(12) United States Patent
Sherman et al.

(10) Patent No.: US 8,492,486 B2
(45) Date of Patent: *Jul. 23, 2013

(54) ADHESIVE COMPOSITIONS

(75) Inventors: Audrey A. Sherman, St. Paul, MN (US); Richard G. Hansen, Mahtomedi, MN (US); Wendi J. Winkler, Minneapolis, MN (US); Charles M. Leir, Falcon Heights, MN (US); Mieczyslaw H. Mazurek, Roseville, MN (US); Karl E. Benson, St. Paul, MN (US); Mark D. Purgett, Oakdale, MN (US); Albert I. Everaerts, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,062

(22) Filed: Aug. 2, 2012

(65) Prior Publication Data
US 2012/0295025 A1 Nov. 22, 2012

Related U.S. Application Data

(63) Continuation of application No. 13/086,706, filed on Apr. 14, 2011, now Pat. No. 8,236,429, which is a continuation of application No. 12/111,618, filed on Apr. 29, 2008, now Pat. No. 7,947,376, which is a continuation of application No. 12/100,167, filed on Apr. 9, 2008, now abandoned, which is a continuation of application No. 11/317,602, filed on Dec. 23, 2005, now Pat. No. 7,371,464.

(51) Int. Cl.
*C09J 183/04* (2006.01)
(52) U.S. Cl.
USPC ..... 525/477; 427/208.4; 427/256; 427/421.1; 427/427.4; 528/26; 528/38
(58) Field of Classification Search
None
See application file for complete search history.

(56) References Cited

U.S. PATENT DOCUMENTS

| | | | |
|---|---|---|---|
| 2,676,182 A | 4/1954 | Daudt | |
| 2,736,721 A | 2/1956 | Dexter | |
| 3,627,851 A | 12/1971 | Brady | |
| 3,772,247 A | 11/1973 | Flannigan | |
| 3,890,269 A | 6/1975 | Martin | |
| 4,119,615 A | 10/1978 | Schulze | |
| 4,661,577 A | 4/1987 | Jo Lane | |
| 4,935,484 A | 6/1990 | Wolfgruber | |
| 5,026,890 A | 6/1991 | Webb | |
| 5,039,738 A * | 8/1991 | Czech | 524/838 |
| 5,082,706 A | 1/1992 | Tangney | |
| 5,110,890 A | 5/1992 | Butler | |
| 5,214,119 A | 5/1993 | Leir | |
| 5,248,739 A | 9/1993 | Schmidt | |
| 5,276,122 A | 1/1994 | Aoki | |
| 5,290,615 A | 3/1994 | Tushaus | |
| 5,302,685 A | 4/1994 | Tsumura | |
| 5,302,735 A | 4/1994 | Neri | |
| 5,319,040 A | 6/1994 | Wengrovius | |
| 5,461,134 A | 10/1995 | Leir | |
| 5,512,650 A | 4/1996 | Leir | |
| 5,663,262 A * | 9/1997 | Shirakawa et al. | 526/312 |
| 5,670,598 A | 9/1997 | Leir | |
| 5,981,680 A | 11/1999 | Petroff | |
| 6,051,216 A | 4/2000 | Barr | |
| 6,121,368 A | 9/2000 | Heying | |
| 6,355,759 B1 | 3/2002 | Sherman | |
| 6,407,195 B2 | 6/2002 | Sherman | |
| 6,441,118 B2 | 8/2002 | Sherman | |
| 6,531,620 B2 | 3/2003 | Brader | |
| 6,531,630 B2 | 3/2003 | Vidalin | |
| 6,664,359 B1 | 12/2003 | Kangas | |
| 6,730,397 B2 | 5/2004 | Melancon | |
| 6,846,893 B1 | 1/2005 | Sherman | |
| 7,371,464 B2 * | 5/2008 | Sherman et al. | 428/447 |
| 7,407,709 B2 | 8/2008 | Zhou | |
| 7,695,818 B2 | 4/2010 | Sherman | |
| 7,947,376 B2 * | 5/2011 | Sherman et al. | 428/447 |
| 8,236,429 B2 * | 8/2012 | Sherman et al. | 428/447 |
| 2003/0165676 A1 | 9/2003 | Zhou | |
| 2003/0175510 A1 | 9/2003 | Sherman | |
| 2003/0235553 A1 | 12/2003 | Lu | |
| 2004/0115153 A1 | 6/2004 | Yu | |
| 2004/0120912 A1 | 6/2004 | Yu | |
| 2007/0149745 A1 | 6/2007 | Leir | |

FOREIGN PATENT DOCUMENTS

| | | |
|---|---|---|
| JP | 2-26234 | 2/1990 |
| JP | 2001-11423 | 1/2001 |
| WO | WO 2004-054523 | 7/2004 |

OTHER PUBLICATIONS

Encyclopedia of Polymer Science and Engineering, New York, John Wiley & Sons, 1989, pp. 265-270.
McGrath, "Synthesis and Characteriztion of Segmented Siloxane Copolymers", Polymer Preprints, Mar. 1998, vol. 39, No. 1, pp. 455-456.

* cited by examiner

*Primary Examiner* — Marc Zimmer
(74) *Attorney, Agent, or Firm* — Jeffrey M. Olofson

(57) ABSTRACT

Polydiorganosiloxane polyoxamide, linear, block copolymers and methods of making the copolymers are provided. The method of making the copolymers involves reacting a diamine with a polydiorganosiloxane precursor having oxalylamino groups. The polydiorganosiloxane polyoxamide block copolymers are of the $(AB)_n$ type.

15 Claims, No Drawings

ADHESIVE COMPOSITIONS

CROSS REFERENCE TO RELATED APPLICATIONS

This application is a continuation of U.S. Ser. No. 13/086,706, filed Apr. 14, 2011, now allowed as U.S. Pat. No. 8,236,429, which is a continuation of U.S. Ser. No. 12/111,618, filed Apr. 29, 2008, now issued as U.S. Pat. No. 7,947,376, which is a continuation of U.S. Ser. No. 12/100,167, filed Apr. 9, 2008, now abandoned, which is a continuation of U.S. Ser. No. 11/317,602, filed Dec. 23, 2005, now issued as U.S. Pat. No. 7,371,464, the disclosure of which is incorporated by reference in its entirety herein.

TECHNICAL FIELD

Adhesive compositions are described that contain a polydiorganosiloxane polyoxamide copolymer.

BACKGROUND

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides and polydiorganosiloxane polyureas are exemplary block copolymers.

Polydiorganosiloxane polyamides have been prepared by condensation reactions of amino terminated silicones with short-chained dicarboxylic acids. Alternatively, these copolymers have been prepared by condensation reactions of carboxy terminated silicones with short-chained diamines. Because polydiorganosiloxanes (e.g., polydimethylsiloxanes) and polyamides often have significantly different solubility parameters, it can be difficult to find reaction conditions for production of siloxane-based polyamides that result in high degrees of polymerization, particularly with larger homologs of the polyorganosiloxane segments. Many of the known siloxane-based polyamide copolymers contain relatively short segments of the polydiorganosiloxane (e.g., polydimethylsiloxane) such as segments having no greater than about 30 diorganosiloxy (e.g., dimethylsiloxy) units or the amount of the polydiorganosiloxane segment in the copolymer is relatively low. That is, the fraction (i.e., amount based on weight) of polydiorganosiloxane (e.g., polydimethylsiloxane) soft segments in the resulting copolymers tends to be low.

Polydiorganosiloxane polyureas are another type of block copolymer. This type of block copolymer has been included in adhesive compositions. Although these block copolymers have many desirable characteristics, some of them tend to degrade when subjected to elevated temperatures such as 250° C. or higher.

SUMMARY

Adhesive compositions, adhesive articles, and methods of making the adhesive articles are provided. More specifically, the adhesive compositions include a polydiorganosiloxane polyoxamide block copolymer and a tackifier. The polydiorganosiloxane polyoxamide copolymers can contain a relatively large fraction of polydiorganosiloxane compared to many known polydiorganosiloxane polyamide copolymers. The adhesive compositions can be formulated as either pressure sensitive adhesives or as heat activated adhesives.

In a first aspect, an adhesive composition is provided that includes (a) a polydiorganosiloxane polyoxamide and (b) a tackifier. The polydiorganosiloxane polyoxamide contains at least two repeat units of Formula I.

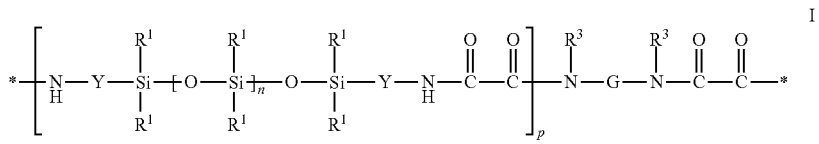

In this formula, each $R^1$ is independently an alkyl, haloalkyl, aralkyl, alkenyl, aryl, or aryl substituted with an alkyl, alkoxy, or halo, wherein at least 50 percent of the $R^1$ groups are methyl. Each Y is independently an alkylene, aralkylene, or a combination thereof. Subscript n is independently an integer of 40 to 1500 and subscript p is an integer of 1 to 10. Group G is a divalent group that is the residue unit that is equal to a diamine of formula $R^3$HN-G-NH$R^3$ minus the two —NH$R^3$ groups (i.e., amino groups). Group $R^3$ is hydrogen or alkyl or $R^3$ taken together with G and with the nitrogen to which they are both attached forms a heterocyclic group. Each asterisk (*) indicates a site of attachment of the repeat unit to another group in the copolymer such as, for example, another repeat unit of Formula I.

In a second aspect, an article is provided that includes a substrate and an adhesive layer adjacent to at least one surface of the substrate. The adhesive layer contains (a) a polydiorganosiloxane polyoxamide having at least two repeat units of Formula I and (b) a tackifier.

In a third aspect, a method of making an article is provided. The method includes providing a substrate and applying an adhesive composition to at least one surface of the substrate. The adhesive composition includes (a) a polydiorganosiloxane polyoxamide having at least two repeat units of Formula I and (b) a tackifier.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

DETAILED DESCRIPTION OF THE INVENTION

Adhesive compositions and articles are provided that contain a polydiorganosiloxane polyoxamide, which is a linear block copolymer of the $(AB)_n$ type, and a tackifier. The adhesive compositions can be either pressure sensitive adhesives or heat activated adhesives.

DEFINITIONS

The terms "a", "an", and "the" are used interchangeably with "at least one" to mean one or more of the elements being described.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent group of formula —$R^a$—$Ar^a$— where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "aryloxy" refers to a monovalent group of formula —OAr where Ar is an aryl group.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyalkylene oxides where the heteroatom is oxygen.

The term "oxalyl" refers to a divalent group of formula —(CO)—(CO)— where each (CO) denotes a carbonyl group.

The terms "oxalylamino" and "aminoxalyl" are used interchangeably to refer to a divalent group of formula —(CO)—(CO)—NH— where each (CO) denotes a carbonyl.

The term "aminoxalylamino" refers to a divalent group of formula —NH—(CO)—(CO)—$NR^d$— where each (CO) denotes a carbonyl group and $R^d$ is hydrogen, alkyl, or part of a heterocyclic group along with the nitrogen to which it is attached. In most embodiments, $R^d$ is hydrogen or alkyl. In many embodiments, $R^d$ is hydrogen.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The term "polydiorganosiloxane" refers to a divalent segment of formula

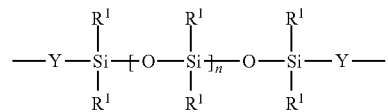

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 40 to 1500.

The term "adjacent" means that a first layer is positioned near a second layer. The first layer can contact the second layer or can be separated from the second layer by one or more additional layers.

The terms "room temperature" and "ambient temperature" are used interchangeably to mean a temperature in the range of 20° C. to 25° C.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Adhesive Compositions

The adhesive compositions contain a linear, polydiorganosiloxane polyoxamide block copolymer and a tackifier. The block polydiorganosiloxane polyoxamide copolymer contains at least two repeat units of Formula I.

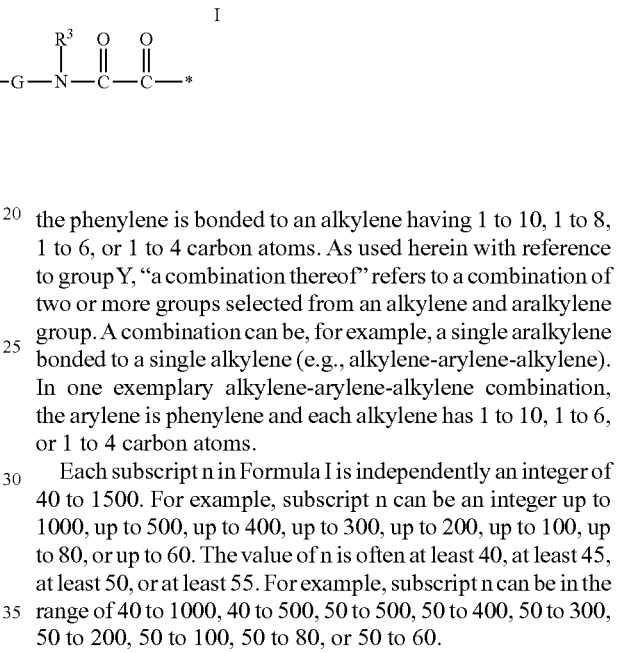

In this formula, each $R^1$ is independently an alkyl, haloalkyl, aralkyl, alkenyl, aryl, or aryl substituted with an alkyl, alkoxy, or halo, wherein at least 50 percent of the $R^1$ groups are methyl. Each Y is independently an alkylene, aralkylene, or a combination thereof. Subscript n is independently an integer of 40 to 1500 and the subscript p is an integer of 1 to 10. Group G is a divalent group that is the residue unit that is equal to a diamine of formula $R^3HN-G-NHR^3$ minus the two —$NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN-G-NHR^3$ is piperazine or the like). Each asterisk (*) indicates a site of attachment of the repeat unit to another group in the copolymer such as, for example, another repeat unit of Formula I.

Suitable alkyl groups for $R^1$ in Formula I typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group having 1 to 10 carbon atoms and an aryl group having 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

At least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula I is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group having 6 to 12 carbon atoms bonded to an alkylene group having 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula I is independently an integer of 40 to 1500. For example, subscript n can be an integer up to 1000, up to 500, up to 400, up to 300, up to 200, up to 100, up to 80, or up to 60. The value of n is often at least 40, at least 45, at least 50, or at least 55. For example, subscript n can be in the range of 40 to 1000, 40 to 500, 50 to 500, 50 to 400, 50 to 300, 50 to 200, 50 to 100, 50 to 80, or 50 to 60.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula I is a residual unit that is equal to a diamine compound of formula $R^3HN-G-NHR^3$ minus the two amino groups (i.e., —$NHR^3$ groups). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN-G-NHR^3$ is piperazine). The diamine can have primary or secondary amino groups. In most embodiments, $R^3$ is hydrogen or an alkyl. In many embodiments, both of the amino groups of the diamine are primary amino groups (i.e., both $R^3$ groups are hydrogen) and the diamine is of formula $H_2N-G-NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula III, which are described below, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

The polydiorganosiloxane polyoxamide tends to be free of groups having a formula —$R^a$—(CO)—NH— where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyoxamide is a linear, block copolymer and can be an elastomeric material. Unlike many of the known polydiorganosiloxane polyamides that are generally formulated as brittle solids or hard plastics, the polydiorganosiloxane polyoxamides can be formulated to include greater than 50 weight percent polydiorganosiloxane segments based on the weight of the copolymer. The weight percent of the diorganosiloxane in the polydiorganosiloxane polyoxamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyoxamides. Higher amounts of the polydiorganosiloxane can be used to prepare elastomeric materials with lower modulus while maintaining reasonable strength.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to about 350° C. Additionally, the copolymers can often be heated at a temperature such as 250° C. for 1 hour in air without apparent degradation as determined by no detectable loss of mechanical strength upon cooling.

The polydiorganosiloxane polyoxamide copolymers have many of the desirable features of polysiloxanes such as low glass transition temperatures, thermal and oxidative stability, resistance to ultraviolet radiation, low surface energy and hydrophobicity, and high permeability to many gases. Additionally, the copolymers exhibit good to excellent mechanical strength.

The copolymeric material of Formula I can be optically clear. As used herein, the term "optically clear" refers to a material that is clear to the human eye. An optically clear copolymeric material often has a luminous transmission of at least about 90 percent, a haze of less than about 2 percent, and opacity of less than about 1 percent in the 400 to 700 nm wavelength range. Both the luminous transmission and the haze can be determined using, for example, the method of ASTM-D 1003-95.

Additionally, the copolymeric material of Formula I can have a low refractive index. As used herein, the term "refractive index" refers to the absolute refractive index of a material (e.g., copolymeric material or adhesive composition) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. The copolymeric material usually has a refractive index in the range of about 1.41 to about 1.50.

The polydiorganosiloxane polyoxamides are soluble in many common organic solvents such as, for example, toluene, tetrahydrofuran, dichloromethane, aliphatic hydrocarbons (e.g., alkanes such as hexane), or mixtures thereof.

The linear block copolymers having repeat units of Formula I can be prepared, for example, as represented in Reaction Scheme A.

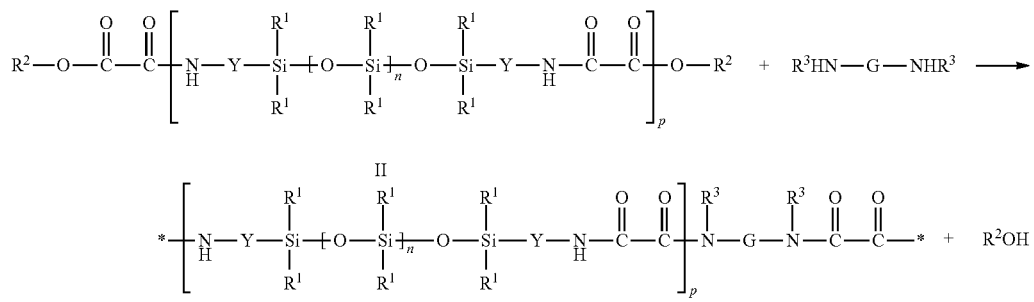

In this reaction scheme, a precursor of Formula II is combined under reaction conditions with a diamine having two primary amino groups, two secondary amino groups, or one primary amino group and one secondary amino group. The diamine is usually of formula $R^3HN\text{-}G\text{-}NHR^3$. The $R^2OH$ by-product is typically removed from the resulting polydiorganosiloxane polyoxamide.

The diamine $R^3HN\text{-}G\text{-}NHR^3$ in Reaction Scheme A has two amino groups (i.e., —$NHR^3$). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., the diamine is piperazine or the like). In most embodiments, $R^3$ is hydrogen or alkyl. In many embodiments, the diamine has two primary amino groups (i.e., each $R^3$ group is hydrogen) and the diamine is of formula $H_2N$-G-$NH_2$. The portion of the diamine exclusive of the two amino groups is referred to as group G in Formula I.

The diamines are sometimes classified as organic diamines or polydiorganosiloxane diamines with the organic diamines including, for example, those selected from alkylene diamines, heteroalkylene diamines, arylene diamines, aralkylene diamines, or alkylene-aralkylene diamines. The diamine has only two amino groups so that the resulting polydiorganosiloxane polyoxamides are linear block copolymers that are often elastomeric, hot melt processible (e.g., the copolymers can be processed at elevated temperatures such as up to 250° C. or higher without apparent degradation of the composition), and soluble in some common organic solvents. The diamine is free of a polyamine having more than two primary or secondary amino groups. Tertiary amines that do not react with the precursor of Formula II can be present. Additionally, the diamine is free of any carbonylamino group. That is, the diamine is not an amide.

Exemplary polyoxyalkylene diamines (i.e., G is a heteroalkylene with the heteroatom being oxygen) include, but are not limited to, those commercially available from Huntsman, The Woodlands, Tex. under the trade designation JEFFAMINE D-230 (i.e., polyoxypropylene diamine having an average molecular weight of about 230 g/mole), JEFFAMINE D-400 (i.e., polyoxypropylene diamine having an average molecular weight of about 400 g/mole), JEFFAMINE D-2000 (i.e., polyoxypropylene diamine having an average molecular weight of about 2,000 g/mole), JEFFAMINE HK-511 (i.e., polyetherdiamine with both oxyethylene and oxypropylene groups and having an average molecular weight of about 220 g/mole), JEFFAMINE ED-2003 (i.e., polypropylene oxide capped polyethylene glycol with an average molecular weight of about 2,000 g/mole), and JEFFAMINE EDR-148 (i.e., triethyleneglycol diamine).

Exemplary alkylene diamines (i.e., G is a alkylene) include, but are not limited to, ethylene diamine, propylene diamine, butylene diamine, hexamethylene diamine, 2-methylpentamethylene 1,5-diamine (i.e., commercially available from DuPont, Wilmington, Del. under the trade designation DYTEK A), 1,3-pentane diamine (commercially available from DuPont under the trade designation DYTEK EP), 1,4-cyclohexane diamine, 1,2-cyclohexane diamine (commercially available from DuPont under the trade designation DHC-99), 4,4'-bis(aminocyclohexyl)methane, and 3-aminomethyl-3,5,5-trimethylcyclohexylamine.

Exemplary arylene diamines (i.e., G is an arylene such as phenylene) include, but are not limited to, m-phenylene diamine, o-phenylene diamine, and p-phenylene diamine. Exemplary aralkylene diamines (i.e., G is an aralkylene such as alkylene-phenyl) include, but are not limited to 4-aminomethyl-phenylamine, 3-aminomethyl-phenylamine, and 2-aminomethyl-phenylamine. Exemplary alkylene-aralkylene diamines (i.e., G is an alkylene-aralkylene such as alkylene-phenylene-alkylene) include, but are not limited to, 4-aminomethyl-benzylamine, 3-aminomethyl-benzylamine, and 2-aminomethyl-benzylamine.

The precursor of Formula II in Reaction Scheme A has at least one polydiorganosiloxane segment and at least two oxalylamino groups. Group $R^1$, group Y, subscript n, and subscript p are the same as described for Formula I. Each group $R^2$ is independently an alkyl, haloalkyl, aryl, or aryl substituted with an alkyl, alkoxy, halo, or alkoxycarbonyl.

Suitable alkyl and haloalkyl groups for $R^2$ often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2,2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for $R^2$ include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl).

The precursor of Formula II can include a single compound (i.e., all the compounds have the same value of p and n) or can include a plurality of compounds (i.e., the compounds have different values for p, different values for n, or different values for both p and n). Precursors with different n values have siloxane chains of different length. Precursors having a p value of at least 2 are chain extended. Different amounts of the chain-extended precursor of Formula II in the mixture can affect the final properties of the elastomeric material of Formula I. That is, the amount of the second compound of Formula II (i.e., p equal to at least 2) can be varied advantageously to provide elastomeric materials with a range of properties. For example, a higher amount of the second compound of Formula II can alter the melt rheology (e.g., the elastomeric material can flow easier when molten), alter the softness of the elastomeric material, lower the modulus of the elastomeric material, or a combination thereof.

In some embodiments, the precursor is a mixture of a first compound of Formula II with subscript p equal to 1 and a second compound of Formula II with subscript p equal to at least 2. The first compound can include a plurality of different compounds with different values of n. The second compound can include a plurality of compounds with different values of p, different values of n, or different values of both p and n. Mixtures can include at least 50 weight percent of the first compound of Formula II (i.e., p is equal to 1) and no greater than 50 weight percent of the second compound of Formula II (i.e., p is equal to at least 2) based on the sum of the weight of the first and second compounds in the mixture. In some mixtures, the first compound is present in an amount of at least 55 weight percent, at least 60 weight percent, at least 65 weight percent, at least 70 weight percent, at least 75 weight percent, at least 80 weight percent, at least 85 weight percent, at least 90 weight percent, at least 95 weight percent, or at least 98 weight percent based on the total amount of the compounds of Formula II. The mixtures often contain no greater than 50 weight percent, no greater than 45 weight percent, no greater than 40 weight percent, no greater than 35 weight percent, no greater than 30 weight percent, no greater than 25 weight percent, no greater than 20 weight percent, no greater than 15 weight percent, no greater than 10 weight percent, no greater than 5 weight percent, or no greater than 2 weight percent of the second compound.

Reaction Scheme A can be conducted using a plurality of precursors of Formula II, a plurality of diamines, or a combination thereof. A plurality of precursors having different average molecular weights can be combined under reaction conditions with a single diamine or with multiple diamines. For example, the precursor of Formula II may include a mixture of materials with different values of n, different values of p, or different values of both n and p. The multiple diamines can include, for example, a first diamine that is an organic diamine and a second diamine that is a polydiorganosiloxane diamine. Likewise, a single precursor can be combined under reaction conditions with multiple diamines.

The molar ratio of the precursor of Formula II to the diamine is often about 1:1. For example the molar ratio is often less than or equal to 1:0.90, less than or equal to 1:0.92, less than or equal to 1:0.95, less than or equal to 1:0.98, or less than or equal to 1:1. The molar ratio is often greater than or equal to 1:1.02, greater than or equal to 1:1.05, greater than or equal to 1:1.08, or greater than or equal to 1:1.10. For example, the molar ratio can be in the range of 1:0.90 to 1:1.10, in the range of 1:0.92 to 1:1.08, in the range of 1:0.95 to 1:1.05, or in the range of 1:0.98 to 1:1.02. Varying the molar ratio can be used, for example, to alter the overall molecular weight, which can effect the rheology of the resulting copolymers. Additionally, varying the molar ratio can be used to provide oxalylamino-containing end groups or amino end groups, depending upon which reactant is present in molar excess.

The condensation reaction of the precursor of Formula II with the diamine (i.e., Reaction Scheme A) are often conducted at room temperature or at elevated temperatures such as at temperatures up to about 250° C. For example, the reaction often can be conducted at room temperature or at temperatures up to about 100° C. In other examples, the reaction can be conducted at a temperature of at least 100° C., at least 120° C., or at least 150° C. For example, the reaction temperature is often in the range of 100° C. to 220° C., in the range of 120° C. to 220° C., or in the range of 150° C. to 200° C. The condensation reaction is often complete in less than 1 hour, in less than 2 hours, in less than 4 hours, in less than 8 hours, or in less than 12 hours.

Reaction Scheme A can occur in the presence or absence of a solvent. Suitable solvents usually do not react with any of the reactants or products of the reactions. Additionally, suitable solvents are usually capable of maintaining all the reactants and all of the products in solution throughout the polymerization process. Exemplary solvents include, but are not limited to, toluene, tetrahydrofuran, dichloromethane, aliphatic hydrocarbons (e.g., alkanes such as hexane), or mixtures thereof.

Any solvent that is present can be stripped from the resulting polydiorganosiloxane polyoxamide at the completion of the reaction. Solvents that can be removed under the same conditions used to remove the alcohol by-product are often preferred. The stripping process is often conducted at a temperature of at least 100° C., at least 125° C., or at least 150° C. The stripping process is typically at a temperature less than 300° C., less than 250° C., or less than 225° C.

Conducting Reaction Scheme A in the absence of a solvent can be desirable because only the volatile by-product, $R^2OH$, needs to be removed at the conclusion of the reaction. Additionally, a solvent that is not compatible with both reactants and the product can result in incomplete reaction and a low degree of polymerization.

Any suitable reactor or process can be used to prepare the copolymeric material according to Reaction Scheme A. The reaction can be conducted using a batch process, semi-batch process, or a continuous process. Exemplary batch processes can be conducted in a reaction vessel equipped with a mechanical stirrer such as a Brabender mixer, provided the product of the reaction is in a molten state has a sufficiently low viscosity to be drained from the reactor. Exemplary semi-batch process can be conducted in a continuously stirred tube, tank, or fluidized bed. Exemplary continuous processes can be conducted in a single screw or twin screw extruder such as a wiped surface counter-rotating or co-rotating twin screw extruder.

In many processes, the components are metered and then mixed together to form a reaction mixture. The components can be metered volumetrically or gravimetrically using, for example, a gear, piston or progressing cavity pump. The components can be mixed using any known static or dynamic method such as, for example, static mixers, or compounding mixers such as single or multiple screw extruders. The reaction mixture can then be formed, poured, pumped, coated, injection molded, sprayed, sputtered, atomized, stranded or sheeted, and partially or completely polymerized. The partially or completely polymerized material can then optionally be converted to a particle, droplet, pellet, sphere, strand, ribbon, rod, tube, film, sheet, coextruded film, web, nonwoven, microreplicated structure, or other continuous or discrete shape, prior to the transformation to solid polymer. Any of these steps can be conducted in the presence or absence of applied heat. In one exemplary process, the components can be metered using a gear pump, mixed using a static mixer, and injected into a mold prior to solidification of the polymerizing material.

The polydiorganosiloxane-containing precursor of Formula II in Reaction Scheme A can be prepared by any known method. In some embodiments, this precursor is prepared according to Reaction Scheme B.

Reaction Scheme B

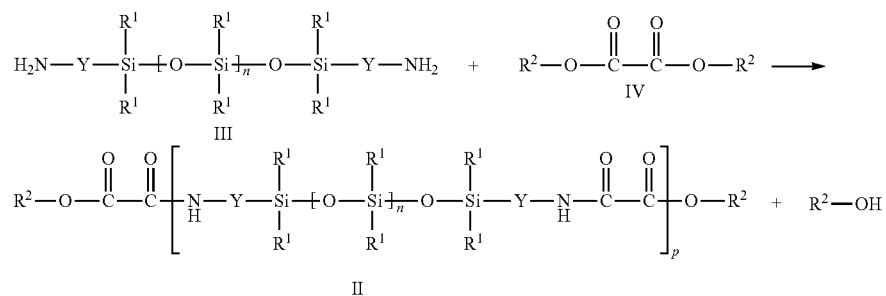

A polydiorganosiloxane diamine of Formula III (p moles) is reacted with a molar excess of an oxalate of Formula IV (greater than p+1 moles) under an inert atmosphere to produce the polydiorganosiloxane-containing precursor of Formula II and $R^2$—OH by-product. In this reaction, $R^1$, Y, n, and p are the same as previously described for Formula I. Each $R^2$ in Formula IV is independently an alkyl, haloalkyl, aryl, or aryl substituted with an alkyl, alkoxy, halo, or alkoxycarbonyl. The preparation of the precursor of Formula II according to Reaction Scheme B is further described in U.S. patent application Ser. No. 11/317,616.

The polydiorganosiloxane diamine of Formula III in Reaction Scheme B can be prepared by any known method and can have any suitable molecular weight, such as an average molecular weight in the range of 700 to 150,000 g/mole. Suitable polydiorganosiloxane diamines and methods of making the polydiorganosiloxane diamines are described, for example, in U.S. Pat. Nos. 3,890,269 (Martin), 4,661,577 (Jo Lane et al.), 5,026,890 (Webb et al.), 5,276,122 (Aoki et al.), 5,214,119 (Leir et al.), 5,461,134 (Leir et al.), 5,512,650 (Leir et al.), and 6,355,759 (Sherman et al.), incorporated herein by reference in their entirety. Some polydiorganosiloxane diamines are commercially available, for example, from Shin Etsu Silicones of America, Inc., Torrance, Calif. and from Gelest Inc., Morrisville, Pa.

A polydiorganosiloxane diamine having a molecular weight greater than 2,000 g/mole or greater than 5,000 g/mole can be prepared using the methods described in U.S. Pat. Nos. 5,214,119 (Leir et al.), 5,461,134 (Leir et al.), and 5,512,650 (Leir et al.). One of the described methods involves combining under reaction conditions and under an inert atmosphere (a) an amine functional end blocker of the following formula

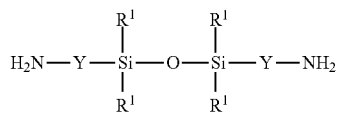

where Y and $R^1$ are the same as defined for Formula I; (b) sufficient cyclic siloxane to react with the amine functional end blocker to form a polydiorganosiloxane diamine having a molecular weight less than 2,000 g/mole; and (c) an anhydrous aminoalkyl silanolate catalyst of the following formula

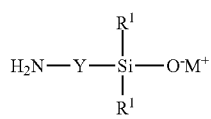

where Y and $R^1$ are the same as defined in Formula I and $M^+$ is a sodium ion, potassium ion, cesium ion, rubidium ion, or tetramethylammonium ion. The reaction is continued until substantially all of the amine functional end blocker is consumed and then additional cyclic siloxane is added to increase the molecular weight. The additional cyclic siloxane is often added slowly (e.g., drop wise). The reaction temperature is often conducted in the range of 80° C. to 90° C. with a reaction time of 5 to 7 hours. The resulting polydiorganosiloxane diamine can be of high purity (e.g., less than 2 weight percent, less than 1.5 weight percent, less than 1 weight percent, less than 0.5 weight percent, less than 0.1 weight percent, less than 0.05 weight percent, or less than 0.01 weight percent silanol impurities). Altering the ratio of the amine end functional blocker to the cyclic siloxane can be used to vary the molecular weight of the resulting polydiorganosiloxane diamine of Formula III.

Another method of preparing the polydiorganosiloxane diamine of Formula III includes combining under reaction conditions and under an inert environment (a) an amine functional end blocker of the following formula

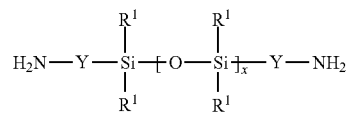

where $R^1$ and Y are the same as described for Formula I and where the subscript x is equal to an integer of 1 to 150; (b) sufficient cyclic siloxane to obtain a polydiorganosiloxane diamine having an average molecular weight greater than the average molecular weight of the amine functional end blocker; and (c) a catalyst selected from cesium hydroxide, cesium silanolate, rubidium silanolate, cesium polysiloxanolate, rubidium polysiloxanolate, and mixtures thereof. The reaction is continued until substantially all of the amine functional end blocker is consumed. This method is further described in U.S. Pat. No. 6,355,759 B1 (Sherman et al.). This procedure can be used to prepare any molecular weight of the polydiorganosiloxane diamine.

Yet another method of preparing the polydiorganosiloxane diamine of Formula III is described in U.S. Pat. No. 6,531,620 B2 (Brader et al.). In this method, a cyclic silazane is reacted with a siloxane material having hydroxy end groups as shown in the following reaction.

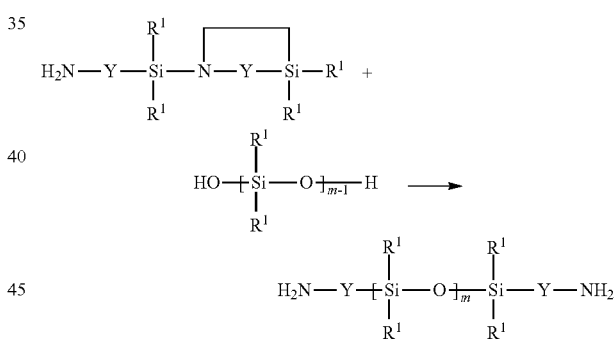

The groups $R^1$ and Y are the same as described for Formula I. The subscript m is an integer greater than 1.

In Reaction Scheme B, an oxalate of Formula IV is reacted with the polydiorganosiloxane diamine of Formula III under an inert atmosphere. The two $R^2$ groups in the oxalate of Formula IV can be the same or different. In some methods, the two $R^2$ groups are different and have different reactivity with the polydiorganosiloxane diamine of Formula III in Reaction Scheme B.

The oxalates of Formula IV in Reaction Scheme B can be prepared, for example, by reaction of an alcohol of formula $R^2$—OH with oxalyl dichloride. Commercially available oxalates of Formula IV (e.g., from Sigma-Aldrich, Milwaukee, Wis. and from VWR International, Bristol, Conn.) include, but are not limited to, dimethyl oxalate, diethyl oxalate, di-n-butyl oxalate, di-tert-butyl oxalate, bis(phenyl) oxalate, bis(pentafluorophenyl) oxalate, 1-(2,6-difluorophenyl)-2-(2,3,4,5,6-pentachlorophenyl) oxalate, and bis(2,4,6-trichlorophenyl) oxalate.

A molar excess of the oxalate is used in Reaction Scheme B. That is, the molar ratio of oxalate to polydiorganosiloxane diamine is greater than the stoichiometric molar ratio, which is (p+1):p. The molar ratio is often greater than 2:1, greater than 3:1, greater than 4:1, or greater than 6:1. The condensation reaction typically occurs under an inert atmosphere and at room temperature upon mixing of the components.

The condensation reaction used to produce the precursor of Formula II (i.e., Reaction Scheme B) can occur in the presence or absence of a solvent. In some methods, no solvent or only a small amount of solvent is included in the reaction mixture. In other methods, a solvent may be included such as, for example, toluene, tetrahydrofuran, dichloromethane, or aliphatic hydrocarbons (e.g., alkanes such as hexane).

Removal of excess oxalate from the precursor of Formula II prior to reaction with the diamine in Reaction Scheme A tends to favor formation of an optically clear polydiorganosiloxane polyoxamide. The excess oxalate can typically be removed from the precursor using a stripping process. For example, the reacted mixture (i.e., the product or products of the condensation reaction according to Reaction Scheme B) can be heated to a temperature up to 150° C., up to 175° C., up to 200° C., up to 225° C., or up to 250° C. to volatilize the excess oxalate. A vacuum can be pulled to lower the temperature that is needed for removal of the excess oxalate. The precursor compounds of Formula II tend to undergo minimal or no apparent degradation at temperatures in the range of 200° C. to 250° C. or higher. Any other known methods of removing the excess oxalate can be used.

The by-product of the condensation reaction shown in Reaction Scheme B is an alcohol (i.e., $R^2$—OH is an alcohol). Group $R^2$ is often limited to an alkyl having 1 to 4 carbon atoms, a haloalkyl having 1 to 4 carbon atoms, or an aryl such as phenyl that form an alcohol that can be readily removed (e.g., vaporized) by heating at temperatures no greater than about 250° C. Such an alcohol can be removed when the reacted mixture is heated to a temperature sufficient to remove the excess oxalate of Formula IV.

Either pressure sensitive adhesives or heat activated adhesives can be formulated by combining the polydiorganosiloxane polyoxamides with a tackifier such as a silicate tackifying resin. As used herein, the term "pressure sensitive adhesive" refers to an adhesive that possesses the following properties: (1) aggressive and permanent tack; (2) adherence to a substrate with no more than finger pressure; (3) sufficient ability to hold onto an adherend; and (4) sufficient cohesive strength to be removed cleanly from the adherend. As used herein, the term "heat activated adhesive" refers to an adhesive composition that is essentially non-tacky at room temperature but that becomes tacky above room temperature above an activation temperature such as above about 30° C. Heat activated adhesives typically have the properties of a pressure sensitive adhesive above the activation temperature.

Tackifying resins such as silicate tackifying resins are added to the polydiorganosiloxane polyoxamide copolymer to provide or enhance the adhesive properties of the copolymer. The silicate tackifying resin can influence the physical properties of the resulting adhesive composition. For example, as silicate tackifying resin content is increased, the glassy to rubbery transition of the adhesive composition occurs at increasingly higher temperatures. In some exemplary adhesive compositions, a plurality of silicate tackifying resins can be used to achieve desired performance.

Suitable silicate tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 to 50,000 or in the range of 500 to 15,000 and generally have methyl R' groups.

MQ silicate tackifying resins are copolymeric resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the silicate tackifying resin, and some are bonded only to other $SiO_{4/2}$ units.

Such resins are described in, for example, *Encyclopedia of Polymer Science and Engineering*, vol. 15, John Wiley & Sons, New York, (1989), pp. 265-270, and U.S. Pat. Nos. 2,676,182 (Daudt et al.), 3,627,851 (Brady), 3,772,247 (Flannigan), and 5,248,739 (Schmidt et al.). Other examples are disclosed in U.S. Pat. No. 5,082,706 (Tangney). The above-described resins are generally prepared in solvent. Dried or solventless, M silicone tackifying resins can be prepared, as described in U.S. Pat. Nos. 5,319,040 (Wengrovius et al.), 5,302,685 (Tsumura et al.), and 4,935,484 (Wolfgruber et al.).

Certain MQ silicate tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicate tackifying resin. This may be accomplished, for example, by reacting hexamethyldisilazane with the silicate tackifying resin. Such a reaction may be catalyzed, for example, with trifluoroacetic acid. Alternatively, trimethylchlorosilane or trimethylsilylacetamide may be reacted with the silicate tackifying resin, a catalyst not being necessary in this case.

MQD silicone tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD silicone tackifying resins, some of the methyl R' groups of the $R'_2SiO_{2/2}$ units ("D" units) can be replaced with vinyl ($CH_2$=CH—) groups ("$D^{Vi}$" units).

MQT silicate tackifying resins are terpolymers having $R'_3SiO_{1/2}$ units, $SiO_{4/2}$ units and $R'SiO_{3/2}$ units ("T" units) such as are taught in U.S. Pat. No. 5,110,890 (Butler) and Japanese Kokai HE 2-36234.

Suitable silicate tackifying resins are commercially available from sources such as Dow Corning, Midland, Mich., General Electric Silicones Waterford, N.Y. and Rhodia Silicones, Rock Hill, S.C. Examples of particularly useful MQ silicate tackifying resins include those available under the trade designations SR-545 and SR-1000, both of which are commercially available from GE Silicones, Waterford, N.Y. Such resins are generally supplied in organic solvent and may be employed in the formulations of the adhesives of the present invention as received. Blends of two or more silicate resins can be included in the adhesive compositions.

The adhesive compositions typically contain 20 to 80 weight percent polydiorganosiloxane polyoxamide and 20 to 80 weight percent silicate tackifying resin based on the combined weight of polydiorganosiloxane polyoxamide and silicate tackifying resin. For example, the adhesive compositions can contain 30 to 70 weight percent polydiorganosiloxane polyoxamide and 30 to 70 weight percent silicate tackifying resin, 35 to 65 weight percent polydiorganosiloxane polyoxamide and 35 to 65 weight percent silicate tackifying resin, 40 to 60 weight percent polydiorganosiloxane polyoxamide and 40 to 60 weight percent silicate tackifying resin, or 45 to 55 weight percent polydiorganosiloxane polyoxamide and 45 to 55 weight percent silicate tackifying resin.

The adhesive composition can be solvent-free or can contain a solvent. Suitable solvents include, but are not limited to, toluene, tetrahydrofuran, dichloromethane, aliphatic hydrocarbons (e.g., alkanes such as hexane), or mixtures thereof.

The adhesive compositions can further include other additives to provide desired properties. For example, dyes and pigments can be added as colorant; electrically and/or thermally conductive compounds can be added to make the adhesive electrically and/or thermally conductive or antistatic; antioxidants and antimicrobial agents can be added; and ultraviolet light stabilizers and absorbers, such as hindered amine light stabilizers (HALS), can be added to stabilize the adhesive against ultraviolet degradation and to block certain ultraviolet wavelengths from passing through the article. Other additives include, but are not limited to, adhesion promoters, fillers (e.g., fumed silica, carbon fibers, carbon black, glass beads, glass and ceramic bubbles, glass fibers, mineral fibers, clay particles, organic fibers such as nylon, metal particles, or unexpanded polymeric microspheres), tack enhancers, blowing agents, hydrocarbon plasticizers, and flame-retardants.

Adhesive Articles and Methods of Making Adhesive Articles

An adhesive article is provided that includes a substrate and an adhesive layer adjacent to at least one surface of the substrate. The adhesive layer contains (a) a polydiorganosiloxane polyoxamide having at least two repeat units of Formula I and (b) a tackifier. The substrates can include a single layer of material or can be a combination of two or more materials.

The substrates can have any useful form including, but not limited to, films, sheets, membranes, filters, nonwoven or woven fibers, hollow or solid beads, bottles, plates, tubes, rods, pipes, or wafers. The substrates can be porous or non-porous, rigid or flexible, transparent or opaque, clear or colored, and reflective or non-reflective. The substrates can have a flat or relatively flat surface or can have a texture such as wells, indentations, channels, bumps, or the like. The substrates can have a single layer or multiple layers of material. Suitable substrate materials include, for example, polymeric materials, glasses, ceramics, sapphire, metals, metal oxides, hydrated metal oxides, or combinations thereof.

Suitable polymeric substrate materials include, but are not limited to, polyolefins (e.g., polyethylene such as biaxially oriented polyethylene or high density polyethylene and polypropylene such as biaxially oriented polypropylene), polystyrenes, polyacrylates, polymethacrylates, polyacrylonitriles, polyvinyl acetates, polyvinyl alcohols, polyvinyl chlorides, polyoxymethylenes, polyesters such as polyethylene terephthalate (PET), polytetrafluoroethylene, ethylene-vinyl acetate copolymers, polycarbonates, polyamides, rayon, polyimides, polyurethanes, phenolics, polyamines, amino-epoxy resins, polyesters, silicones, cellulose based polymers, polysaccharides, nylon, neoprene rubber, or combinations thereof. Some polymeric materials are foams, woven fibers, non-woven fibers, or films.

Suitable glass and ceramic substrate materials can include, for example, silicon, aluminum, lead, boron, phosphorous, zirconium, magnesium, calcium, arsenic, gallium, titanium, copper, or combinations thereof. Glasses typically include various types of silicate containing materials.

Some substrates are release liners. The adhesive layer can be applied to a release liner and then transferred to another substrate such as a backing film or foam substrate. Suitable release liners typically contain a polymer such as polyester or polyolefin or a coated paper. Some adhesive articles transfer tape that contains an adhesive layer positioned between two release liners. Exemplary release liners include, but are not limited to, polyethylene terephthalate coated with a fluorosilicone such as that disclosed in U.S. Pat. No. 5,082,706 (Tangney) and commercially available from Loparex, Inc., Bedford Park, Ill.). The liner can have a microstructure on its surface that is imparted to the adhesive to form a microstructure on the surface of the adhesive layer. The liner can be removed to provide an adhesive layer having a microstructured surface.

In some embodiments, the adhesive article is a single sided adhesive tape in which the adhesive layer is on a single major surface of a substrate such as a foam or film. In other embodiments, the adhesive article is a double-sided adhesive tape in which the adhesive layer is on two major surfaces of a substrate such as a foam or film. The two adhesive layers of the double-sided adhesive tape can be the same or different. For example, one adhesive can be a pressure sensitive adhesive and the other a heat activated adhesive where at least one of the adhesives is based on the polydiorganosiloxane polyoxamide. Each exposed adhesive layer can be applied to another substrate.

The adhesive articles can contain additional layers such as primers, barrier coatings, metal and/or reflective layers, tie layers, and combinations thereof. The additional layers can be positioned between the substrate and the adhesive layer, adjacent the substrate opposite the adhesive layer, or adjacent to the adhesive layer opposite the substrate.

A method of making an adhesive article typically includes providing a substrate and applying an adhesive composition to at least one surface of the substrate. The adhesive composition includes (a) a polydiorganosiloxane polyoxamide having at least two repeat units of Formula I and (b) a tackifier. The adhesive composition can be applied to the substrate by a wide range of processes such as, for example, solution coating, solution spraying, hot melt coating, extrusion, coextrusion, lamination, and pattern coating. The adhesive composition is often applied as an adhesive layer to a surface of substrate with a coating weight of 0.02 grams/154.8 $cm^2$ to 2.4 grams/154.8 $cm^2$.

The adhesive articles of the invention may be exposed to post processing steps such as curing, crosslinking, die cutting, heating to cause expansion of the article, e.g., foam-in-place, and the like.

The foregoing describes the invention in terms of embodiments foreseen by the inventor for which an enabling description was available, notwithstanding that insubstantial modifications of the invention, not presently foreseen, may nonetheless represent equivalents thereto.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| 5K PDMS diamine | Polydimethylsiloxane diamine with an approximate molecular weight of 5,000 g/mole that was prepared as described in U.S. Pat. No. 5,214,119. |
| 14K PDMS diamine | Polydimethylsiloxane diamine with an approximate molecular weight of 14,000 g/mole that was prepared as described in U.S. Pat. No. 6,355,759. |
| 33K PDMS diamine | Polydimethylsiloxane diamine with an approximate molecular weight of 33,000 g/mole that was prepared as described in U.S. Pat. No. 6,355,759. |
| THF | Tetrahydrofuran |
| MQ Resin-1 | A 62.9 weight percent solids solution of MQ silicate resin in xylene, commercially available from Dow Corning Corporation, Midland, MI under the trade designation 2-7066. |
| MQ Resin-2 | A 60 weight percent solids solution of MQ silicate resin in toluene, commercially available from GE Silicones, Waterford, NY under the trade designation SR-545. |
| IPA | Isopropyl alcohol |
| PET | An aminated-polybutadiene primed polyester film of polyethylene terephthalate having a thickness of 38 micrometers. |
| CTH room | Constant temperature and humidity room set to 25° C. and 50 percent relative humidity |
| PMMA | Plates of 3.0 millimeters thick poly(methyl methacrylate), commercially available from Plaskolite, Inc., Columbus, OH. |
| PC | Plates of 4.4 millimeters thick LEXAN polycarbonate, commercially available from General Electric, Schenectady, NY. |
| HDA | Hexane diamine |

Test Methods

180° Peel Adhesion

This peel adhesion test is similar to the test method described in ASTM D 3330-90, substituting a glass substrate, polymethylmethacrylate substrate, or polycarbonate substrate for the stainless steel substrate described in the test.

Unless otherwise noted, adhesive coatings on polyester film were cut into 1.27 centimeter by 15 centimeters strips. Each strip was then adhered to a 10 centimeters by 20 centimeters clean, solvent washed, glass coupon using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 2.3 meters/minute (90 inches/minute) over a five second data collection time. Two samples were tested; the reported peel adhesion value was an average of the peel adhesion value from each of the two samples. Peel adhesion values were recorded in ounces/inch and converted to Newtons/decimeter (N/dm).

Shear Strength

This shear strength test is similar to the test method described in ASTM D 3654-88. Unless otherwise noted, adhesive coatings on polyester film were cut into 1.27 centimeter (0.5 inch) by 15 centimeters (6 inch) strips. Each strip was then adhered to a stainless steel panel such that a 1.27 centimeters by 1.27 centimeter portion of each strip was in firm contact with the panel and one end portion of the tape being free. The panel with a coated strip attached was held in a rack such that the panel formed an angle of 178 degrees with the extended tape free end which was tensioned by application of a force of one kilogram applied as a hanging weight from the free end of the coated strip. The 178 degrees was used to negate any peel forces, thus ensuring that only shear strength forces were measured, in an attempt to more accurately determine the holding power of the tape being tested. The time elapsed for each tape example to separate from the test panel was recorded as the shear strength. All shear strength failures (if the adhesive failed at less than 10,000 minutes) reported herein were cohesive failures of the adhesive. Each test was terminated at 10,000 minutes, unless the adhesive failed at an earlier time (as noted).

Hardness Testing

Shore A Hardness was measured according to ASTM D2240-5 Standard Test Method for Rubber Property—Durometer Hardness. This test method is based on the penetration of a specific type of indentor when forced into the material under specified conditions. The indentation hardness is inversely related to the penetration and is dependent on the elastic modulus and viscoelastic behavior of the material Titration Method to Determine Equivalent Weight Approximately 10 grams (precisely weighed) of the precursor compound of Formula II was added to a jar. Approximately 50 grams THF solvent (not precisely weighed) was added. The contents were mixed using a magnetic stir bar mix until the mixture was homogeneous. The theoretical equivalent weight of precursor was calculated and then an amount of N-hexylamine (precisely weighed) in the range of 3 to 4 times this number of equivalents was added. The reaction mixture was stirred for a minimum of 4 hours. Bromophenol blue (10-20 drops) was added and the contents were mixed until homogeneous. The mixture was titrated to a yellow endpoint with 1.0N (or 0.1N) hydrochloric acid. The number of equivalents of precursor was equal to the number of equivalents of N-hexylamine added to the sample minus the number of equivalents of hydrochloric acid added during titration. The equivalent weight (grams/equivalent) was equal to the sample weight of the precursor divided by the number of equivalents of the precursor.

Preparative Example 1

A sample of 14K PDMS diamine (830.00 grams) was placed in a 2 liter, 3-neck resin flask equipped with a mechanical stirrer, heating mantle, nitrogen inlet tube (with stopcock), and an outlet tube. The flask was purged with nitrogen for 15 minutes and then, with vigorous stirring, diethyl oxalate (33.56 grams) was added dropwise. This reaction mixture was stirred for approximately one hour at room temperature and then for 75 minutes at 80° C. The reaction flask was fitted with a distillation adaptor and receiver. The reaction mixture was heated under vacuum (133 Pascals, 1 Torr) for 2 hours at 120° C. and then for 30 minutes at 130° C., until no further distillate was able to be collected. The reaction mixture was cooled to room temperature to provide an oxamido ester terminated silicone product (i.e., this was a precursor according to Formula II). Gas chromatographic analysis of the clear, mobile liquid showed that no detectable amount of diethyl oxalate remained. The ester equivalent weight was determined by titration (equivalent weight=8,272 grams/equivalent).

Preparative Example 2

Diethyl oxalate (241.10 grams) was placed in a 3 liter, 3-neck resin flask equipped with a mechanical stirrer, heating mantle, nitrogen inlet tube (with stopcock), and an outlet tube. The flask was purged with nitrogen for 15 minutes and 5K PDMS diamine (2,028.40 grams) was added slowly with stirring. After 8 hours at room temperature, the reaction flask was fitted with a distillation adaptor and receiver, the contents stirred and heated to 150° C. under vacuum (133 Pascals, 1 Torr) for 4 hours, until no further distillate was able to be collected. The remaining liquid was cooled to room temperature to provide 2,573 grams of oxamido ester terminated product (i.e., this was a precursor according to Formula II). Gas chromatographic analysis of the clear, mobile liquid showed that no detectable level of diethyl oxalate remained. Molecular weight was determined by titration (equivalent weight=2,578 grams/mole).

Preparative Example 3

The precursor of Preparative Example 1 (50.00 grams) and the precursor of Preparative Example 2 (50.00 grams, eq. wt.=2,674) were weighed into a jar and stirred until homogeneous. Ethylene diamine (0.7509 grams) was added, the jar was sealed and the mixture was stirred rapidly until the contents became too viscous to flow. After sitting overnight at ambient temperature, the solid product was dissolved in THF (201 grams) to provide the silicone polyoxamide product as a clear, viscous solution. A sample obtained after evaporation of the solvent at ambient temperature was an elastomeric film having a Shore A hardness of 33.

Example 1

The polymer solution from Preparative Example 3 (50.00 grams, 33.4% solids), MQ Resin-2 (26.09 grams, 64.0% solids), and IPA (7.60 grams) were weighed into a jar and mixed overnight at ambient conditions. The resulting solution was knife coated (using a gap of 152 micrometers, 6 mils) onto PET. The coated film was dried for about 15 minutes at ambient temperature followed by 15 minutes in a 130° C. oven. The dried film was stored overnight in the CTH room. The resulting pressure sensitive adhesive was tested for 180° peel to glass and shear strength using the test methods outlined above. The results are presented in Table 1.

Preparative Example 4

The precursor of Preparative Example 1 (100.00 grams) and m-xylylene diamine (0.8316 gram) were weighed into a jar. The jar was sealed and the mixture was stirred rapidly agitated until the contents became too viscous to flow. The jar was placed on a roller mill overnight at ambient temperature. The solid product was dissolved in THF (201 grams) to provide the silicone polyoxamide product as a clear, viscous solution. A sample obtained after evaporation of the solvent at ambient temperature was an elastomeric film having a Shore A hardness of 34.

Example 2

The polymer solution from Preparative Example 4 (50.00 grams, 33.4% solids), MQ Resin-2 (26.10 grams, 64.0% solids), and IPA (7.60 grams) were weighed into a jar and mixed overnight at ambient conditions. The resulting solution was knife coated (using a gap of 152 micrometers, 6 mils) onto PET. The coated film was dried for about 15 minutes at ambient temperature followed by 15 minutes in a 130° C. oven. The dried film was stored overnight in the CTH room. The resulting pressure sensitive adhesive was tested for 180° peel to glass and shear strength using the test methods outlined above, the results presented in Table 1.

Preparative Example 5

The precursor of Preparative Example 1 (98.13 grams) and ethylene diamine (0.36 grams) were weighed into a jar. The jar was sealed and the mixture was rapidly agitated until the contents became too viscous to flow. The jar was placed on a roller mill overnight at ambient temperature. The solid product was dissolved in THF (200 grams). The solution was cast into a glass Petri dish and the THF was allowed to slowly evaporate overnight at ambient temperature. This provided the silicone polyoxamide as a clear, elastomeric film having a Shore A hardness of 35.

Example 3

The copolymer of Preparative Example 5 (18.50 grams) was dissolved in IPA (8.60 grams) and THF (37.00 grams). MQ Resin-2 (30.83 grams, 60.0% solids) was added to the polymer solution. The resulting mixture was mixed overnight at ambient conditions and then knife coated (using a gap of 152 micrometers, 6 mils) onto PET. The coated film was dried for about 15 minutes at ambient temperature followed by 10 minutes in a 130° C. oven. The dried film was stored overnight in the CTH room. The resulting pressure sensitive adhesive was tested for 180° peel to glass and shear strength using the test methods outlined above. The results are presented in Table 1.

Example 4

The copolymer of Preparative Example 5 (52.25 grams) was dissolved in IPA (89.00 grams) and hexane (90.00 grams). MQ resin-1 (68.16 grams, 62.7% solids) was added to this polymer solution and the mixture was stirred overnight at ambient conditions. The resulting solution was knife coated (using a gap of 152 micrometers, 6 mils) onto PET. The coated film was dried for about 15 minutes at ambient temperature followed by 15 minutes in a 130° C. oven. The dried film was stored overnight in the CTH room. The resulting pressure sensitive adhesive was tested for 180° peel to glass and shear strength using the test methods outlined above. The results are presented in Table 1.

Preparative Example 6

A sample of 33K PDMS diamine (2028.40 grams) was placed in a 2 liter, 3-neck resin flask equipped with a mechanical stirrer, heating mantle, nitrogen inlet tube (with stopcock), and an outlet tube. The flask was purged with nitrogen for 15 minutes and then, with vigorous stirring, diethyl oxalate (35.50 grams) was added dropwise. This reaction mixture was stirred for approximately one hour at room temperature and then for 75 minutes at 80° C. The reaction flask was then fitted with a distillation adaptor and receiver. The reaction mixture was heated under vacuum (133 Pascals, 1 Torr) for 4 hours at 160° C. until no further distillate was able to be collected. The reaction mixture was cooled to room temperature to provide the oxamido ester terminated silicone product (i.e., precursor of Formula II). Gas chromatographic analysis of the clear, mobile liquid showed that no detectable level of diethyl oxalate remained. The ester equivalent weight was determined using $^1$H NMR (eq. wt.=17,424 grams/eq.).

Preparative Example 7

The precursor of Preparative Example 6 (51.15 grams) and the precursor of Preparative Example 2 (51.15 grams, eq.

wt.=2,591.6) were weighed into a reaction vessel. While stirring at ambient temperature, ethylene diamine (0.6881 gram) was added. The mixture was stirred rapidly until the viscosity became too high for the product to flow. The reaction mixture was heated to 175° C. with stirring for one hour. The viscous, molten product was cast into a glass baking dish and cooled to room temperature to provide a clear polydiorganosiloxane polyoxamide elastomer.

Example 5

The copolymer of Preparative Example 7 (10.50 grams) was dissolved in IPA (2.50 grams) and THF (12.00 grams). MQ Resin-1 (20.45 grams, 62.7% solids) was added to this polymer solution and the mixture stirred overnight at ambient conditions. The resulting solution was knife coated (using a gap of 152 micrometers, 6 mils) onto PET. The coated film was dried for about 15 minutes at ambient temperature followed by 10 minutes in a 130° C. oven. The dried film was stored overnight in the CTH room. The resulting pressure sensitive adhesive was tested for 180° peel to glass and shear strength using the test methods outlined above. The results are presented in Table 1.

Preparative Example 8

Di-trifluoroethyl oxalate (0.466 gram) was added with stirring to a solution of 15.0 grams of 33K PDMS diamine in 138.0 grams of toluene within a jar. After 90 minutes, a solution of 0.1615 gram of HDA in 3.0 grams of toluene was added. The jar was sealed and agitated on a roller mill overnight to provide a clear solution of the silicone polyoxamide product.

Example 6

The copolymer solution of Preparative Example 8 (30.00 grams, 10% solids) and MQ Resin-1 (3.91 grams, 62.7% solids) were weighed into a jar and heated to 55° C. The jar was cooled to ambient temperature. IPA (3.44 grams) was added and the mixture was mixed overnight at ambient conditions. The resulting solution was knife coated (using a gap of 152 micrometers, 6 mils) onto PET. The coated film was dried for about 15 minutes at ambient temperature followed by 10 minutes in a 130° C. oven. The dried film was stored overnight in the CTH room. The resulting pressure sensitive adhesive was tested for 180° peel to glass and shear strength using the test methods outlined above. The results are presented in Table 1.

TABLE 1

| Example | 180° Peel Strength (N/dm) | Shear Strength (minutes) |
| --- | --- | --- |
| 1 | 98.2 | >10,000 |
| 2 | 103.5 | >10,000 |
| 3 | 112.7 | >10,000 |
| 4 | 57.3 | 6,192 |
| 5 | 43.8 | 3,196 |
| 6 | 93.4 | 2,183 |

Preparative Example 9

Diethyl oxalate (241.10 grams) was placed in a 3 liter two part resin flask. A sample of 5K PDMS diamine (2,028.40 grams) was added slowly to this stirred liquid. The resulting mixture was purged with nitrogen for 15 minutes, stirred overnight at room temperature, and then heated to 150° C. under vacuum for 4 hours. A gas chromatogram of the last fraction of distillate collected in the condenser showed negligible diethyl oxalate. To this ethyl oxalamido terminated silicone intermediate product (i.e., precursor according to Formula II) was added a solution of HDA (44.09 grams) in THF (56 milliliters) and the resulting solution was heated to 150° C. with stirring in an oil bath. A slight vacuum was applied to remove THF and ethanol (using a condenser). The molten product was backfilled with nitrogen, heated for 4 more hours, and cast into glass dishes. The yield was 2,078.15 grams.

Example 7

A sample of the copolymer prepared in Preparative Example 9 (10.00 grams) was placed in a jar. MQ Resin-2 (16.50 grams at 61 weight percent solids in toluene) was added to give a 50:50 by weight mixture of copolymer: MQ Resin-2 as a 35 weight percent solids mixture in THF/toluene (65:35). This PSA solution was coated onto PET film using a knife coater with a 38 micrometer (0.015 inch) gap to form a PSA tape. The coated film was dried in a 90° C. oven for 10 minutes and placed in the CTH room for overnight equilibration. Laminates of samples of this PSA tape were made to a glass substrate (Example 7A), to a PMMA substrate (Example 7B), and to a PC substrate (Example 7C) using a 2-kilogram roller passed once over the strip. In addition, laminates of samples of this PSA tape were made to a glass substrate (Example 7D), to a PMMA substrate (Example 7E) and to a PC substrate (Example 7F) using a rubber-to-rubber roll laminator, heated to 100° C. The 180° peel adhesion for these 6 types of laminates were run immediately (initial sample), after 1 hour (1 hour sample), and after 24 hours (24 hour sample) using the test method described above. The results are shown in Table 2. Shear Strength samples were prepared at room temperature (Example 7G) and 70° C. for 15 minutes (Example 7H) and were run using the test method described above. The results are shown in Table 3.

TABLE 2

| Example | 180° Peel Adhesion Initial (N/dm) | 180° Peel Adhesion after 1 hour (N/dm) | 180° Peel Adhesion after 24 hours (N/dm) |
| --- | --- | --- | --- |
| 7A | 62.5 | 57.8 | 62.9 |
| 7B | 56.6 | 61.5 | 57.8 |
| 7C | 68.6 | 61.9 | 63.1 |
| 7D | 64.5 | NM | NM |
| 7E | 62.8 | NM | NM |
| 7F | 65.6 | NM | NM |

NM = not measured

TABLE 3

| Example | Shear Strength room temperature preparation (minutes) | Shear Strength 70° C. preparation (minutes) |
| --- | --- | --- |
| 7G | 10,000 | 10,000 |
| 7H | 10,000 | 10,000 |

We claim:
1. A method of making an adhesive an adhesive article comprising
providing a substrate, and
coating an adhesive composition on a first major surface of the substrate, the adhesive composition comprising:

a) a polydiorganosiloxane polyoxamide comprising at least two repeat units of Formula I:

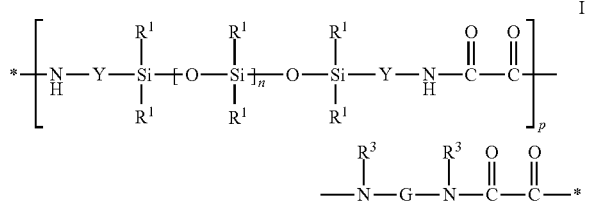

wherein
- each $R^1$ is independently an alkyl, haloalkyl, aralkyl, alkenyl, aryl, or aryl substituted with an alkyl, alkoxy, or halo, wherein at least 50 percent of the $R^1$ groups are methyl;
- each Y is independently an alkylene, aralkylene, or a combination thereof;
- G is a divalent residue equal to a diamine of formula $R^3$HN-G-NHR$^3$ minus the two —NHR$^3$ groups;
- $R^3$ is hydrogen or alkyl or $R^3$ taken together with G and with the nitrogen to which they are both attached forms a heterocyclic group;
- n is independently an integer of 40 to 1500; and
- p is an integer of 1 to 10; and
- an asterisk (*) indicates a site of attachment of the repeat unit to another group in the copolymer; and b) a tackifier.

2. The method of claim 1 comprising exposing the adhesive article to a post processing step.

3. The method of claim 2 wherein the post processing step comprises curing the adhesive.

4. The method of claim 2 wherein the post processing step comprises crosslinking the adhesive.

5. The method of claim 2 wherein the post processing step comprises die cutting the adhesive article.

6. The method of claim 2 wherein the post processing step comprises heating the adhesive article.

7. The method of claim 2 wherein the substrate is multi-layer.

8. The method of claim 2 comprising coating a second adhesive layer on the substrate, opposite the adhesive layer.

9. The method of claim 1 wherein the adhesive is coated by solution coating.

10. The method of claim 1 wherein the adhesive is coated by solution spraying.

11. The method of claim 1 wherein the adhesive is coated by hot melt coating.

12. The method of claim 1 wherein the adhesive is coated by extrusion.

13. The method of claim 1 wherein the adhesive is coated by lamination.

14. The method of claim 1 wherein the adhesive is coated by pattern coating.

15. The method of claim 1 wherein the adhesive is coated with a coating weight of 0.02 grams/154.8 cm$^2$ to 2.4 grams/154.8 cm$^2$.

* * * * *

UNITED STATES PATENT AND TRADEMARK OFFICE
CERTIFICATE OF CORRECTION

PATENT NO. : 8,492,486 B2  
APPLICATION NO. : 13/565062  
DATED : July 23, 2013  
INVENTOR(S) : Audrey A Sherman et al.

Page 1 of 1

It is certified that error appears in the above-identified patent and that said Letters Patent is hereby corrected as shown below:

Column 2, title page – Other Publications
Line 3, Delete "Characteriztion" and insert -- Characterization --, therefor.

Column 2, title page – Abstract
Line 5, Delete "polydioroganosiloxane" and insert -- polydiorganosiloxane --, therefor.

In the Specifications

Column 9
Line 42, Delete "a" and insert -- an --, therefor.

Column 20
Line 23, Delete "material" and insert -- material. --, therefor.

In the Claims

Column 24
Line 63, In Claim 1, after "an adhesive" delete "an adhesive".

Signed and Sealed this
Twenty-ninth Day of April, 2014

Michelle K. Lee
*Deputy Director of the United States Patent and Trademark Office*